United States Patent Office 3,387,793
Patented June 11, 1968

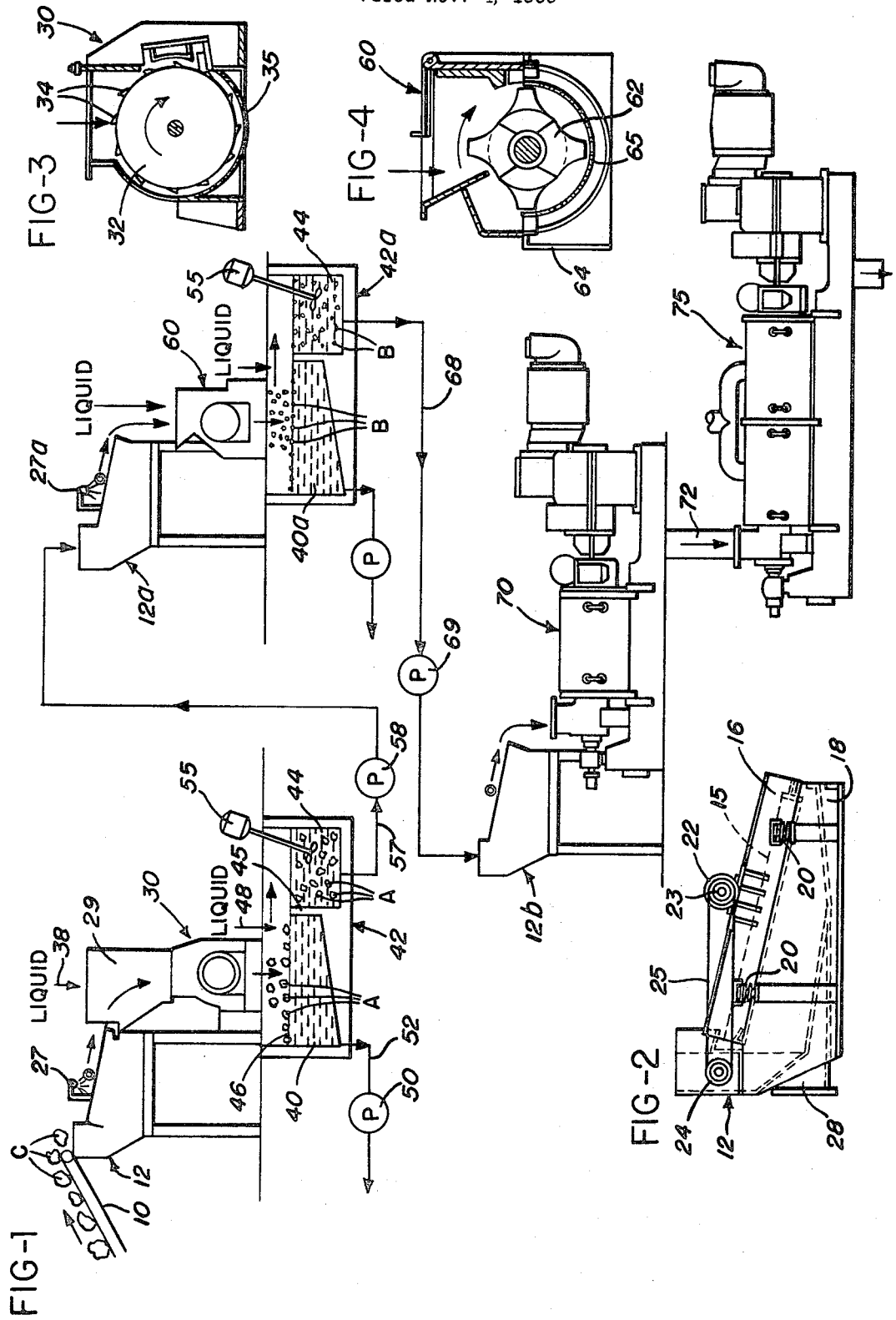

3,387,793
PROCESS AND SYSTEM FOR
TREATING RUBBER
Andre H. Burner, deceased, late of Piqua, Ohio, by Jean M. Burner, executrix, Piqua, Ohio, assignor to The French Oil Mill Machinery Company, Piqua, Ohio, a corporation of Ohio
Filed Nov. 4, 1965, Ser. No. 506,623
13 Claims. (Cl. 241—20)

ABSTRACT OF THE DISCLOSURE

Coagulated chunks of rubber are shredded into smaller pieces to release embedded foreign objects, the pieces are collected within a chamber containing sufficient liquid to enable the foreign objects to settle and the pieces to float off in the form of a slurry into a second chamber where the slurry is agitated to remove foreign particles from the surface of the pieces, the liquid is drained from the slurry, and the pieces are pressed with progressively increasing pressure to remove a high percentage of liquid from the pieces.

---

This invention relates to the treatment of rubber material, particularly rubber as received in the raw or natural state, and more particularly, to a process and system for releasing and separating foreign objects or particles from the material to improve the quality of the material.

As an example of one application of the invention, natural rubber material is usually received by a rubber processing plant in large chunks which are formed by a coagulation of the fluid latex received from the rubber trees and other semi-coagulated forms such as earth scrap, cup lump, slab, and tree lace. Commonly, the coagulated chunks have collected foreign objects and particles such as twigs, sand, dirt, bark and the like which have fallen or sometimes are deliberately placed into the latex before coagulation. These foreign objects and particles must be removed at some point early in the processing of the rubber material to achieve a high quality material, and also for the protection of machinery used to dewater, dry, or otherwise process the material.

It is also desirable for obtaining optimum capacity and efficiency to separate the foreign objects in a continuous operation rather than handling of the material in batches. To provide for an effective and efficient cleaning of the material, it is desirable to convert the chunks into substantially smaller pieces to expose a large surface area such that substantially all of the embedded foreign particles are released.

Accordingly, it is a primary object of the present invention to provide a novel continuous process and system for handling raw rubber material as received in coagulated chunks whereby substantially all undesirable foreign objects and particles are removed from the rubber material.

It is another object of the invention to provide a novel process and system for cleaning rubber material as received in coagulated chunks and for converting the material into substantially smaller pieces or particles so that substantially all foreign objects and particles are released.

As a further object, the present invention provides a process and system for treating in a continuous operation large chunks of rubber material, and preferably includes a plurality of successive stages depending on the type and quantity of foreign matter which may have been coagulated with the chunks of material.

A further object of the invention is to provide a system as outlined above, including at least one mechanical screw press which receives the small clean pieces of rubber material and efficiently dewaters and dries the pieces for removing substantially all moisture.

Another object of the invention is to provide a system for cleaning and drying and/or dewatering rubber materials, involving the use of a mechanical press, wherein foreign particles which might damage the press are removed from the material before it is fed into the press.

Other objects and advantages of the invention will be apparent from the following description, the accompanying drawing and the appended claims.

In the drawing—

FIG. 1 is a schematic flow diagram of a system for cleaning and shredding rubber material in accordance with the process of the invention;

FIG. 2 is a detailed elevational view of a vibrator-type dewatering screen as employed in the system shown in FIG. 1;

FIG. 3 is a cross-section of a typical shredding device which may be employed in the first stage of the system; and FIG. 4 is a cross-section of a typical shredding device as may be employed in a subsequent stage of the system.

Referring to the drawing which illustrates a preferred embodiment of the invention, the system shown in FIG. 1 can conveniently handle and clean upwards of 8,000 pounds per hour of rubber material. Preferably, the material is transported by an endless belt conveyor 10 from a suitable storage area (not shown) in the form of large coagulated chunks C, as for example, sliced bales, to the upper receiving end of a vibrating screen 12 such as the type manufactured by The Link-Belt Corporation of Milwaukee, Wis. A screen of this type commonly employs a perforated deck or plate 15 (FIG. 2) mounted within a frame 16 which is supported in an inclined position on a housing 18 by a series of coil springs 20. To provide the vibration of the perforated plate 15, a weight 22 is eccentrically mounted on a shaft 23 which is supported by the frame 16 and is rotated by a motor 24 through a belt drive 25.

Positioned above the perforated plate 15 is a series of spray nozzles 27 from which liquid is sprayed downwardly over the chunks C of material supported by the plate 15 to flush away foreign objects loosely adhering to the surface of the chunks through the plate 15 and into the discharge outlet 28. After the washed chunks C of material move downwardly over the perforated plate 15, they are received within the hopper 29 feeding a shredder 30, commonly referred to as a hog. A typical device of this type is manufactured by Mitts and Merrill of Saginaw, Mich. This shredder 30 basically includes a power driven rotary drum 32 which has a series of axially extending chopper knives 34 mounted around its periphery. Mounted adjacent the bottom portion of the drum 32 is a semi-cylindrical perforated screen 35, preferably having openings of approximately one-half to one inch in diameter formed therein.

Thus the shredder 30 receives the washed chunks C of rubber material from the vibrating screen 12 and shreds the chunks into smaller particles or pieces A, as for example, of approximately one-half inch to one inch in size. To help wash the chunks of material while in the shredder 30 and to promote its operation, liquid such as water can be added to the receiving hopper 29 through the line 38.

The pieces A which are discharged from the shredder 30 are received within a settling chamber 40 defined by a tank 42. The tank 42 also includes an agitation chamber 44 which is separated from the settling chamber 40 by a vertically extending weir 45. Liquid within the settling chamber 40 and agitation chamber 44 is maintained at a level indicated by the line 46, slightly above the top of weir 45 (or any aperture therein), by collecting the liquid which flows through the shredder 30 and/or by adding liquid through the water supply line 48.

Since the density of the rubber pieces A discharged from the shredder 30 is less than the density of the liquid, the rubber pieces will float on top of the liquid within the chamber 40 while the heavier foreign objects and particles which are released from the rubber pieces by the shredder 30 will settle to the bottom of the chamber 40 to form a sludge which is removed by a pump 50 connected to the settling chamber 40 by the drain line 52.

An agitator 55 is employed for circulating the liquid and rubber pieces A which flow over the weir 45 and into the agitation chamber 44 to form a slurry which is removed from the bottom portion of the agitation chamber 44 through a pipe line 57 connected to a slurry pump 58. By continuously removing the slurry from the agitation chamber 44, the rubber particles or pieces A floating on the surface of the liquid contained within the settling chamber 40 flow over the weir 45 and into the agitation chamber 44.

The slurry of liquid and rubber pieces A which is removed by the pump 58 is preferably delivered to a second stage of the system which also includes a second vibrating screen 12a having a series of spray nozzles 27a positioned overhead. In this manner, further washing and flushing of the rubber pieces A is accomplished thereby providing for further separation of foreign objects such as bark and the like which float over the weir 45 with the pieces A.

The washed rubber pieces A discharged from the second vibrating screen 12a are passed through a second shredder 60 which further reduces the pieces A into smaller pieces or particles B which are approximately one quarter to one-half inch in size. The particles B are delivered to another settling chamber 40a from which they float to a second agitation chamber 44a.

Preferably the shredder 60 is of the hammer mill type, as for example, the type manufactured by The Jeffrey Manufacturing Company, Columbus, Ohio. This type of hammer mill usually includes a rigid hammer member 62 (FIG. 4) rotatably supported within a housing 64 and has a semi-cylindrical perforated plate 65 mounted on the lower portion thereof. The plate 65 is preferably provided with openings of approximately one-half inch or smaller in diameter to form the one inch particles A into the particles B which are discharged into the second settling chamber 40a.

The slurry of liquid and particles B received within the line 68 connected to the second agitation chamber 44a may be directed through a third stage of successive washing, shredding and settling. However, experience has indicated that additional stages are usually unnecessary since two stages of the system appear to separate substantially all of the foreign objects and particles from the rubber material. Thus the slurry received within the line 68 is transported by a pump 69 to a third vibrating screen 12b having a perforated plate with openings somewhat smaller than one-quarter inch so that substantially all of the liquid within the slurry is drained from the particles B before the particles are delivered to the drying phase.

It has been found that effective and efficient drying of the rubber particles B is provided by directing the small particles from the third vibrating screen 12b into a dewatering screw press 70 having a discharge connected by a conduit 72 to the inlet of a dewatering and drying screw press 75. The structure of the screw presses 70 and 75 are disclosed in applicant's copending application Ser. No. 477,350 filed July 21, 1965, now Patent No. 3,276,353, and assigned to the same assignee as the present invention.

From the drawing and the above description, it can be seen that the process and system of the present invention provides several desirable features and advantages.

Basically, the invention provides a process and system by which large coagulated chunks of natural rubber material containing foreign objects are converted in a continuous operation into substantially smaller pieces or particles which are essentially free of foreign objects and which provide substantial surface area for an effective and efficient dewatering and/or drying operation.

In one or more stages, the rubber material is shredded into substantially smaller pieces for releasing the undesirable foreign particles which are then separated within a continuously flowing settling chamber and a flushing action so that the system provides for high capacity by a continuous operation in addition to an effective removal of the foreign objects. Then by feeding the small pieces through one or a series of screw presses, it has been found that substantially all of the moisture is efficiently removed from the rubber material.

While the form of process and apparatus herein described constitutes a preferred embodiment of the invention, it is to be understood that the invention is not limited to this precise form of process and apparatus, and that changes may be made therein without departing from the scope of the invention which is defined in the appended claims.

What is claimed is:

1. A process for separating foreign objects such as dirt, sand and the like in a continuous operation from coagulated chunks of rubber material and for converting the chunks into substantially smaller pieces to provide for an efficient subsequent drying operation, comprising the steps of conveying the chunks of material substantially as received in the raw state into a shredder, shredding the chunks into substantially smaller pieces for releasing foreign objects embedded within the chunks, washing the pieces with liquid for separating the released foreign objects, and pressing the pieces with progressively increasing pressure for removing a high percentage of liquid from the pieces.

2. A process for separating foreign objects in a continuous operation from coagulated chunks of rubber material and for converting the chunks into substantially smaller pieces, comprising the steps of conveying the chunks of material substantially as received in the raw state into a shredder, shredding the chunks into substantially smaller pieces for releasing foreign objects embedded within the chunks, collecting the pieces within a chamber having liquid therein to a depth sufficient to provide for settling of the foreign objects and floating of the pieces, withdrawing liquid with the rubber pieces entrained therein from adjacent the surface of the liquid in said chamber to form a slurry, and draining the liquid from the slurry.

3. The process defined in claim 2 incluuding the additional step of washing the material during said shredding action to promote the shredding and separating operation.

4. The process defined in claim 2 including the additional step of pressing the material after draining of liquid from the slurry to express at least the major portion of absorbed liquid from the material.

5. A process for separating foreign objects in a continuous operation from large coagulated pieces of rubber material and for converting the pieces into substantially smaller pieces for subsequent drying operation, comprising directing the material through a plurality of successive stages, each stage including the steps of directing the pieces of material into a shredder, shredding the pieces into smaller pieces for releasing foreign objects embedded therein, collecting the smaller pieces within a chamber having a body of liquid therein of sufficient depth to provide for settling of the foreign objects and floating of the pieces, draining a flow of liquid with the rubber pieces suspended therein from said chamber substantially adjacent the surface of the liquid to form a slurry, and draining the liquid from the slurry.

6. A process for separating foreign objects in a continuous operation from large coagulated chunks of rubber material and for converting the chunks into substantially smaller pieces to provide for an efficient subsequent drying operation, comprising the steps of conveying the chunks of material substantially as received in the raw state over a screen and spraying liquid onto the chunks to flush foreign objects therefrom, shredding the chunks into substantially smaller pieces for releasing foreign objects embedded within the chunks, collecting the pieces within a first chamber having liquid therein of a sufficient depth to provide for settling of the foreign objects and floating of the pieces, draining a flow of liquid with the rubber pieces suspended therein from said first chamber adjacent the surface of the liquid into a second chamber, agitating the liquid and rubber pieces in said second chamber to form a slurry, and draining the liquid from the slurry.

7. A process for separating foreign objects such as dirt, sand, bark and the like in a continuous operation from large coagulated pieces of natural rubber material and for converting the pieces into substantially smaller pieces to provide for an efficient subsequent drying operation, comprising directing the material through a plurality of successive stages, each stage including the steps of conveying the pieces of material over a screen and spraying liquid onto the pieces to flush foreign objects therefrom, shredding the pieces into substantially smaller pieces for releasing foreign objects embedded therein, collecting the smaller pieces within a first chamber having liquid therein to provide for settling of the foreign objects and floating of the smaller pieces, draining a flow of liquid with the pieces suspended therein from said first chamber substantially adjacent the liquid level into a second chamber, agitating the liquid and rubber pieces in said second chamber to form a slurry, and draining the liquid from the slurry.

8. A system for separating foreign objects in a continuous operation from large coagulated chunks of rubber material and for converting the chunks into substantially smaller pieces to provide for an efficient subsequent drying operation, said system comprising rotary shredder means for shredding the chunks into smaller pieces and thereby releasing foreign objects embedded within the chunks, means for transporting the chunks of rubber material into said shredder, means defining a chamber receiving the smaller pieces discharged from said shredder means, means for adding liquid to said chamber in an amount and to a depth sufficient to provide for settling of the heavier foreign objects and floating of the pieces of rubber, means for draining a continuous flow of liquid with the rubber pieces suspended therein from a portion of said chamber adjacent the surface of the liquid to form a slurry, and means for draining the liquid from such slurry.

9. A system as defined in claim 8 including a mechanical screw press receiving the wet pieces from said draining means and operating to express substantial additional amounts of liquid from the pieces.

10. A system for separating foreign objects such as dirt, sand, bark and the like in a continuous operation from large coagulated pieces of rubber material and for converting the pieces into smaller pieces to provide additional surface area for an efficient subsequent drying operation, said system comprising a plurality of successive stages each including rotary shredder means, means for transporting the pieces of rubber material into said shredder means for shredding the chunks into smaller pieces and thereby releasing foreign objects embedded within the pieces, means defining a chamber for receiving the smaller pieces from said shredder means, means for adding liquid to said chamber to provide for settling of heavier ones of the foreign objects and floating of the pieces of rubber, means for draining a continuous flow of liquid with the rubber pieces suspended therein from a portion of said chamber adjacent the liquid level to form a slurry, and means for draining the liquid from the slurry.

11. A system for separating foreign objects such as direct, sand bark and the like in a continuous operation from large coagulated chunks of natural rubber material and for converting the chunks into substantially smaller pieces to provide for an efficient subsequent drying operation, comprising a screen, means conveying large chunks of the natural rubber material substantially as received in the raw state over said screen, means for spraying liquid onto the chunks while on said screen to flush foreign objects from the surface thereof, shredder means receiving the chunks from said screen and operative to shred them into substantially smaller pieces thereby releasing foreign objects embedded within the chunks, means defining a first chamber for receiving the smaller pieces from said shredder means, means maintaining in said chamber a pool of liquid to provide for settling of the foreign objects and floating of the rubber pieces, a second chamber, means draining a flow of liquid with the rubber pieces suspended therein from said first chamber adjacent the surface of the liquid and into said second chamber, means agitating the liquid and rubber pieces in said second chamber to form a slurry, and means for draining liquid from the slurry.

12. A system as defined in claim 11 including a second shredding means receiving the rubber pieces from said draining means, a third chamber containing a body of liquid and receiving pieces discharged from said second shredding means, a fourth chamber communicating with said third chamber and receiving a flow of liquid and pieces of rubber from the top of the body of liquid in said third chamber, means for removing the mixed liquid and rubber pieces as a slurry from said fourth chamber, and a second draining means arranged to drain liquid from the slurry removed from said fourth chamber.

13. A system as defined in claim 11 including screw press dryer means receiving the smaller rubber pieces from said draining means and operating to remove substantially all of the liquid from the pieces.

References Cited

UNITED STATES PATENTS

| | | | |
|---|---|---|---|
| 2,672,296 | 3/1954 | Venable | 241—68 X |
| 2,864,560 | 12/1958 | Carkeek et al. | 241—68 X |
| 3,000,055 | 9/1961 | Schlicksupp | 241—98 X |
| 3,160,352 | 12/1964 | Mollring | 241—98 |
| 3,300,147 | 1/1967 | Johnson | 241—20 |

WILLIAM W. DYER, Jr., *Primary Examiner.*

W. D. BRAY, *Assistant Examiner.*